(12) United States Patent
Sakai

(10) Patent No.: US 8,724,220 B2
(45) Date of Patent: May 13, 2014

(54) DEPOLARIZING FILM HAVING AN OPTICALLY ANISOTROPIC VOLUMETRIC REGION

(75) Inventor: Takeya Sakai, Aichi (JP)

(73) Assignee: Hayashi Telempu Co., Ltd., Aichi (JP)

( * ) Notice: Subject to any disclaimer, the term of this patent is extended or adjusted under 35 U.S.C. 154(b) by 0 days.

(21) Appl. No.: 13/225,052

(22) Filed: Sep. 2, 2011

(65) Prior Publication Data
US 2011/0310482 A1 Dec. 22, 2011

Related U.S. Application Data
(63) Continuation of application No. PCT/JP2010/053322, filed on Mar. 2, 2010.

(30) Foreign Application Priority Data

Mar. 4, 2009 (JP) .................................. 2009-051120

(51) Int. Cl.
G02B 5/30 (2006.01)
(52) U.S. Cl.
CPC ..................................... G02B 5/3083 (2013.01)
USPC ..................................................... 359/494.01
(58) Field of Classification Search
USPC ..................................................... 359/494.01
See application file for complete search history.

(56) References Cited

U.S. PATENT DOCUMENTS

| | | | |
|---|---|---|---|
| 5,624,974 A * | 4/1997 | Onishi et al. ..................... 522/96 |
| 6,743,487 B2 | 6/2004 | Sakai et al. |
| 6,952,310 B1 * | 10/2005 | Miyatake et al. ........ 359/487.06 |
| 7,245,431 B2 * | 7/2007 | Watson et al. ........... 359/485.03 |
| 2002/0128341 A1 | 9/2002 | Sakai et al. |
| 2004/0265593 A1 * | 12/2004 | Kamijo et al. ............. 428/411.1 |
| 2009/0244474 A1 | 10/2009 | Fuchida et al. |
| 2009/0310067 A1 | 12/2009 | Shoji et al. |

FOREIGN PATENT DOCUMENTS

| | | |
|---|---|---|
| JP | 02184804 A | 7/1990 |
| JP | 10010522 A | 1/1998 |
| JP | 10010523 A | 1/1998 |
| JP | 2002202409 A | 7/2002 |
| JP | 2004170595 A | 6/2004 |

(Continued)

OTHER PUBLICATIONS

Notice of Reasons for Rejection issued Jan. 7, 2014 in corresponding Japanese Patent Application No. 2011-502757; 3 pages.

Primary Examiner — Derek S Chapel
(74) Attorney, Agent, or Firm — Pierce Atwood LLP; Kevin M. Farrell

(57) ABSTRACT

Directed to a film having a depolarizing function, in which anisotropic volumetric regions are dispersed in a translucent matrix. For the translucent matrix, a material capable of forming a film itself, a hard coating layer formed on a surface of the film or a layer of an adhesive can be employed. It is therefore possible to provide a film, having a depolarizing function, of a kind in which when the film of the present invention is mounted on a surface of a polarizing plate arranged on a surface of a liquid crystal display device or an organic electroluminescent display device, the polarized state of a display light emerging outwardly from a display screen is partially altered and, hence, even when polarizing eyeglasses are worn on, darkening of the displayed image can be prevented and, also, a considerable shading of the color tone of the image can be reduced.

13 Claims, 2 Drawing Sheets

(56) References Cited

FOREIGN PATENT DOCUMENTS

| | | |
|---|---|---|
| JP | 2005037890 A | 2/2005 |
| JP | 2006313293 A | 11/2006 |
| JP | 2007304215 A | 11/2007 |
| JP | 2008310310 A | 12/2008 |
| JP | 2009251035 A | 10/2009 |
| WO | 2007119592 A1 | 10/2007 |
| WO | WO 2007119592 A1 * | 10/2007 |

* cited by examiner

OBSERVED THROUGH NO POLARIZING PLATE

OBSERVED THROUGH THE POLARIZING PLATE

DEPOLARIZING FILM HAVING AN OPTICALLY ANISOTROPIC VOLUMETRIC REGION

CROSS REFERENCE TO THE RELATED APPLICATION

This application is a continuation application, under 35 U.S.C §111 (a) of international application No. PCT/JP2010/053322, filed Mar. 2, 2010, which claims priority to Japanese patent application No. 2009-51120, filed Mar. 4, 2009, the entire disclosure of which is herein incorporated by reference as a part of this application.

BACKGROUND OF THE INVENTION

1. Field of the Invention

The present invention relates to a depolarizing film adapted to be disposed on a polarizing plate of a kind used on a surface of a liquid crystal display device, an organic electroluminescent display device or the like and, also, to a method of making such depolarizing film. More specifically, the present invention relates to the film of the kind referred to above, which is effective to avert a possible reduction in visibility that may lead to darkening of the display when the latter is viewed with polarizing eyeglasses.

2. Description of Related Art

The liquid display device generally includes a liquid crystal cell, made up of two transparent substrates with a liquid crystal composition filled in a gap between those substrates, and one set of polarizing plates each disposed on one of opposite sides of the liquid crystal cell. In the liquid crystal display device of the structure discussed above, when an electric voltage is applied to the liquid crystal composition through transparent electrodes deposited on the inner surfaces of the transparent substrates, the orientation of the liquid crystal composition changes to permit light from a backlighting source to pass through or be intercepted by the liquid crystal cell.

The liquid crystal display device is generally classified into TN type, STN type, VA type, IPS type, OCB type and so on depending on the light modulating system of liquid crystal molecules used. However, regardless of the specific type, the liquid crystal display device in general makes use of a set of polarizing plates together with the liquid crystal cell. Accordingly, in this type of the liquid crystal display device utilizing the polarizing plates, a viewer perceives a portion of the incoming light which has passed through the polarizing plates disposed on the liquid crystal cell and has hence been linearly polarized.

On the other hand, the organic electroluminescent display device is known to be of a type in which a layer of electroluminescent material accommodated between two layers of metal conductors emits visible light when an electric current is applied thereto, but the metal conductors have such a high light reflectivity that the incoming external light other than the visible light generated from the electroluminescent layer may be reflected by such metal conductors enough to reduce in contrast of the image being displayed. In order to avoid the reflection of the external light upon the metal conductors, circular polarizing plates each made up of a ¼ wavelength plate and a polarizing plate are employed and the front most surface of the display device is covered with a linear polarizing plate. Accordingly, even with the organic electroluminescent display device, a viewer perceives a portion of the incoming light which has passed through the polarizing plate on the surface of the display device and has hence been linearly polarized.

In recent years, with the wide spreading use of the liquid crystal display device or the organic electroluminescent display device on the occasion of enjoying audio-visual presentations of one-segment terrestrial digital audio/video and data broadcasting services, and in automobile instrument panels and car navigation systems, which is promulgated by countrywide adaption of the terrestrial digital television broadcasting system developed for portable appliances such as, for example, mobile cells to receive it, the opportunity is increasing, in which the liquid crystal display device or the organic electroluminescent display device is used in the outdoor environment or at a site where the external light is intensive.

On the other hand, the polarizing eyeglasses are effective to remove a reduction in visibility, which would otherwise result from reflection of an automobile dashboard on the front windshield during the driving of an automotive vehicle, to remove a glaring caused by reflection of the sun light on a rear windowpane of the leading car, to reduce glaring on a water surface during fishing or marine sports and so on. For this reason, it is quite often that a viewer wears the polarizing eyeglasses when looking at a liquid crystal display device or an organic electroluminescent display device. When the viewer wears the polarizing eyeglasses when looking at the liquid crystal display device or the organic electroluminescent display device, the displayed image will be darkened when the polarizing absorption axes of the polarizing eyeglasses and the polarizing axis of light emerging from the liquid crystal display device match with each other, thus posing a problem associated with a considerable reduction in visibility.

The JP Laid-open Patent Publication No. H10-10522, published in the year of 1998, suggests the provision of a depolarizing means on the liquid display surface to thereby alleviate the problems and inconveniences discussed hereinabove. According to this prior art publication, the depolarizing means is in the form of a depolarizing plate comprised of a combination of two quartz plates. It is, however, been found that covering of an entire display screen of the liquid crystal display device with the depolarizing means in the form of the combination of the two quartz plates is not practical. Also, the JP Laid-open Patent Publication No. H10-10523, also published in the year of 1998, discloses the use of a double refraction plate such as, for example, a ¼ wavelength plate for converting the display light, emerging outwardly from the liquid crystal display surface, from a linearly polarized light into a circular polarized light or an elliptically polarized light. Although with this method according to the second mentioned prior art publication, there is no possibility that the darkening occurs even when the polarizing eyeglasses are worn on, a problem arises that the color tone of the displayed image may be shaded depending on the direction in which the head is tilted leftward or rightward.

PRIOR ART LITERATURE

[Prior Art Document 1] JP Laid-open Patent Publication No. H10-10522
[Prior Art Document 2] JP Laid-open Patent Publication No. H10-10523

SUMMARY OF THE INVENTION

In view of the foregoing problems and inconveniences, the present invention has been devised to provide a film effective to substantially eliminate such possibilities that when a liquid crystal display device or an organic electroluminescent display device is viewed with polarizing eyeglasses worn on, the visibility would be reduced as a result of darkening of a displayed image and/or the displayed image may be undesirably colored.

In order to accomplish the foregoing object of the present invention, a film having a depolarizing function, which is prepared according to the present invention, is characterized by comprising an optically anisotropic volumetric region dispersed in a translucent matrix.

According to the above described construction, when the film of the present invention is mounted on a surface of the polarizing plate arranged on the surface of the liquid crystal display device or the organic electroluminescent display device, the polarized state of the display light emerging outwardly from the display screen can be partially changed and, hence, even when the polarizing eyeglasses were worn on, darkening of the displayed image can be prevented and, also, a considerable shading of the color tone of the display image, which would otherwise result from depending on the direction in which the head is tilted leftward or rightward, can be reduced.

Preferably, a hard coat layer formed by the translucent matrix is provided on at least one surface of a translucent base film. By so doing, when the film of the present invention is mounted on the surface of the polarizing plate arranged on the surface of the liquid crystal display device or the organic electroluminescent display device, the polarized state of the display light emerging outwardly from the display screen can be partially changed and, hence, even when the polarizing eyeglasses were worn on, darkening of the displayed image can be prevented and, also, a considerable shading of the color tone of the display image, which would otherwise result from depending on the direction in which the head is tilted leftward or rightward, can be reduced. Also, an effect of anti-glaring can be obtained because reflected light of an external light resulting from surface irregularities formed on the surface can be diffused.

The film of the present invention may include a layer of an adhesive formed by the translucent matrix, which layer is provided on at least one surface of a translucent base film. Accordingly, when the film of the present invention is mounted on a front surface of a polarizing plate arranged on a surface of the liquid crystal display device or the organic electroluminescent display device, the polarized state of display light emerging outwardly from a display screen can be partially changed so that even when the polarizing eyeglasses are worn on, not only can an undesirable darkening of the displayed image be prevented, but also an undesirable shading of the color tone of the displayed image, which would otherwise results depending on the direction in which the head is tilted leftward or rightward, can be reduced.

In the present invention, the anisotropic volumetric region may have an average particle size not greater than 50 micron. The translucent matrix or the translucent base film may be optically isotropic in a plane. Also, the anisotropic volumetric region may include a photo-alignment material.

In a process, of manufacture of the film of the present invention, a step of irradiating with a linearly polarized light and/or a step of heating and cooling the film in addition to the irradiation of the linearly polarized light may be included.

In the film of the present invention, the anisotropic volumetric region may have an optical axis oriented in a constant direction.

In the present invention, it may be a polarizing plate, in which the film of the present invention is used as a protective film, or a polarizing plate having the film of the present invention laminated.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF PREFERRED EMBODIMENTS

Hereinafter, some preferred embodiments of the present invention will be described in detail with reference to the accompanying drawings.

Figure 1:
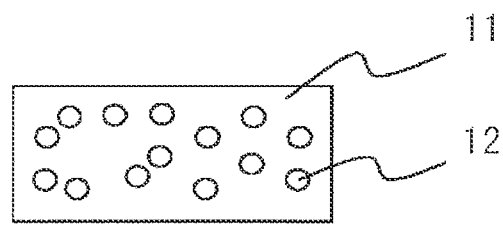
FIG. 1 is a schematic diagram showing a structure of a film according to a preferred embodiment of the present invention.
Figure 5:
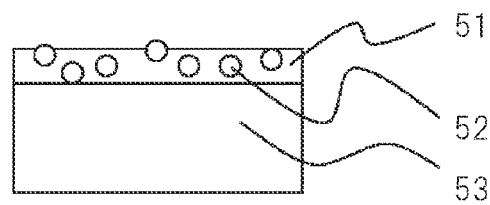
FIG. 5 is a schematic diagram showing the structure of the film according to another preferred embodiment of the present invention.
Figure 6:
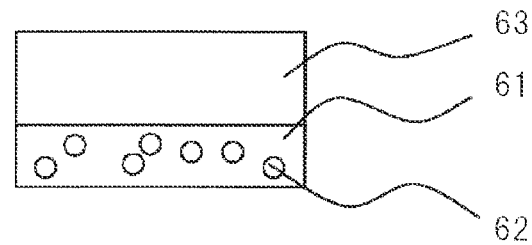
FIG. 6 is a schematic diagram showing the structure of the film according to a further preferred embodiment of the present invention.

The depolarizing film prepared in accordance with the present invention is a film contains a translucent matrix and anisotropic volumetric regions dispersed optically into the translucent matrix. For the translucent matrix, a material capable of forming a film itself as shown in a schematic diagram of FIG. 1, a hard coating layer formed on a surface of the film as shown in a schematic diagram of FIG. 5 and a layer of an adhesive as shown in a schematic diagram of FIG. 6 can be enumerated. In FIGS. 1, 5 and 6, reference numeral 11 represents a material forming a film itself, reference numeral 51 represents a hard coating agent, and reference numeral 61 represents an adhesive or a pressure sensitive adhesive. Reference numerals 12, 52 and 62 represent respective volumetric regions having an optically anisotropic property and reference numerals 53 and 63 represent respective base films. When the film of the present invention is applied to a surface of a polarizing plate disposed on a surface of a liquid crystal (LC) display device or an organic electroluminescent (EL) display device or the like, the polarized state of image-wise rays of light emerging outwardly from a display surface of the display device can be partially changed and, therefore, not only can darkening of the displayed image, even though the viewer wears polarizing eyeglasses, be alleviated, but a considerable shade or shift in color tone of the image displayed, which would occur when the viewer tilts his or her head rightward or leftward, also can be minimized.

For the base film, a TAC (triacetylcellulose) film having an optically in-plane isotropic property and cycloolefin film can be enumerated, although not exclusively limited thereto. Also, even though a translucent base film is in the form of a stretched film (optically anisotropic), characteristics desired or required in the present invention can be obtained if such translucent base film has an optical axis aligned with the absorption axis or the transmission axis of the polarizing plate disposed on a front surface of the display device.

The optical axis of the optically anisotropic volumetric regions may or may not be oriented in a constant direction. If the optical axis is oriented in the constant direction, that optical axis is to be disposed not parallel to the transmission axis or the absorption axis of the polarizing plate. As for the optically anisotropic volumetric regions, it is essential that it has an optically anisotropic property. For the optically anisotropic volumetric regions, the use may be contemplated of a photo-alignment material of a kind suggested by the inventor of the present invention and disclosed in any one of the JP Laid-open Patent Publications No. 2002-202409, No. 2004-170595 and No. 2007-304215. The photo-alignment material suggested by the inventor of the present invention has a capability of expressing the optically anisotropic property when subjected to process steps of radiation with polarizing ultraviolet rays of light and heating and cooling and is employed in the form of microparticles in the practice of the present invention. According to the method of making the film of a kind having a depolarizing function, in which the microparticles of the photo-alignment material form the optically anisotropic volumetric regions, the microparticles of the photo-alignment material are dispersed in the translucent matrix so as to form a film or form a film by coating. Although the microparticles of the photo-alignment material has no anisotropic property immediately after having been filmed or coated, the anisotropic property can be expressed when the film or coating is treated through a process including UV radiation and heating and cooling.

After the anisotropy has been expressed in the manner described above, the anisotropic property in the microparticles is fixed by radiating them with ultraviolet rays of light if desired or required. The ultraviolet rays of light used in fixing the anisotropic property in the microparticles may be either linear polarized light or non-polarized light. For the optically anisotropic volumetric regions, other than those formed by the use of the microparticles of the photo-alignment material, they may have a phase separated structure in which the anisotropic property can be expressed from the condition in which the photo-alignment material is dissolved in the matrix solution or the photo-alignment material is dispersed as a solution. Also, the photo-alignment material may not be necessarily limited to the one which expresses the optically anisotropic property when radiated with polarized light and heated, the photo-alignment material may contain a filler material of a kind in which crystals of an organic or inorganic compound having an optically anisotropic property are finely pulverized.

The optically anisotropic volumetric regions preferably have a size smaller than that of a pixel of a display element, but if the filler material having an anisotropic property is larger than the pixel, dazzling will occur, which constitutes a cause of reduction in image quality. Although it depends on the size of the pixel, the average particle size of the optically anisotropic regions is generally desirably not greater than 50 μm.

In the depolarizing film of the present invention, where polarized rays of light pass through the film, volumetric region light passing through the optically anisotropic volumetric regions and light passing only through the matrix, but not through the optically anisotropic volumetric region are mixed up. Where they pass only through the matrix, the light so transmitted therethrough is not affected by a phase difference. On the other hand, the volumetric region light passing through the optically anisotropic volumetric regions is affected by the phase difference. Also, even with the volumetric region light passing through the optically anisotropic volumetric regions, depending on the particle size for each of the optically anisotropic volumetric regions, the difference in anisotropic property or the direction of the optical axis of the optically anisotropic volumetric region, the polarized state of the transmitted light varies. As a result, when the linearly polarized light passes through the film of the present invention, the light so transmitted is represented by rays of light having different polarized states mixed up.

In general, the stretched film tends to be affected by a constant phase difference over the entire volumetric regions of the film particularly when the polarized light passes therethrough. The polarized state due to the phase difference is uniform over the entire volumetric regions of the film and has a wavelength dependency. For this reason, it constitutes a cause of a considerable shading of the color tone of the image particularly when the image is viewed with the polarizing eyeglasses worn on. On the other hand, in the depolarizing film of the present invention, the volumetric region light passing through the optically anisotropic volumetric regions poses different polarized states as hereinbefore described and is therefore not uniform. Because of this, the wavelength dependency can be suppressed because of the uneven polarized states in each of wavelength volumetric regions and, therefore, the considerable shading of the color tone of the image viewed with the polarizing eyeglasses worn on can be suppressed.

Also, particularly where the optically anisotropic volumetric regions are added in a hard coat layer in the form of microparticles, reflected light of the external light can be diffused by the presence of surface indentations on a surface and, therefore, it can be expected to obtain an anti-glaring property.

Experiments

A synthesizing method associated with a raw compound of the photo-alignment material used in the practice of the present invention will be described hereinafter.

(Monomer 1)

P-coumaric acid and 6-chloro-1-hexanol were heated in the presence of alkali to synthesize 4-(6-hydroxyhexyloxy) cinnamic acid. The resultant product was then added with an excessive amount of methacrylic acid in the presence of p-toluenesulfonic acid to initiate an esterification reaction to thereby syntherize a monomer 1 having the following chemical formula 1.

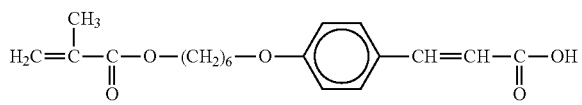

(Polymer 1)

The monomer 1 prepared in the manner described above was dissolved in a concentration of 20 wt % into 1,4-dioxane and, after 2 mol % of AIBN (azobisisobutyronitrile) had been added as a reaction initiator to the resultant mixture, followed by slow agitation for 8 hours at 70° C. The reaction solution was poured into methanol and the resultant precipitate was, after having been filtered, dried to provide the polymer 1. The resultant polymer 1 exhibited a liquid crystallinity at a temperature within the range of 135 to 187° C. Also, no absorption in the visible light range was exhibited.

A method of preparing the microparticles employed in Example 1, Example 3, Example 4, Example 5 and Example 6 of the present invention will now be described.

The polymer 1 prepared in the manner described above was dissolved in a concentration of 5 wt % into 1,4-dioxane. Subsequently, the resultant solution was sprayed into through a two-fluid nozzle by the aid of a compressed air. Solid fine particles formed upon evaporation of a solvent from droplets of the sprayed solution were then collected to provide the microparticles of the polymer 1. Those microparticles so obtained were microparticles of the photo-alignment material capable of expressing the optical anisotropy upon polarized lighting and heating and slow cooling.

The following are descriptions of how the depolarizing films according to the various examples of the present invention were prepared.

Example 1

5 wt % of the microparticles of the polymer 1 referred to above was dissolved into a hard coating agent of a thermosetting solvent type (Principal components of the solvent: methyl ethyl ketone and isopropanol, Non-volatile component: 30%, Viscosity: 5cP). The resultant suspension was coated on a TAC film with the use of a spin coater driven under conditions of 1,000 rpm for 30 seconds. After the TAC film had been coated, the coated film was left to stand under the atmosphere of 85° C. for 1 minute to dry. Thereafter, the hard coat deposited on a surface of the TAC film was radiated for 400 seconds with light projected from an ultraviolet light projecting device, which used a high pressure mercury vapor lamp as a light source, and subsequently converted into a linearly polarized light with the use of a Glan-Taylor polarizing prism (a polarizing element having an air layer forming the boundary surface). The coated TAC film was placed within a temperature controlled bath of 125° C. and subsequently allowed to cool down to room temperature in 20 minutes. Also, the coated surface was radiated for 400 seconds with the light projected from the ultraviolet light projecting device with no use of the Glan-Taylor polarizing prism, but left unpolarized.

Figure 2:
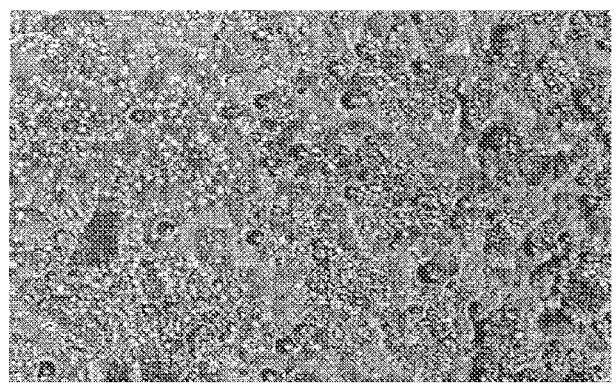
FIG. 2 is a microgram showing the film prepared in the practice of Example 1 in accordance with the present invention.
Figure 3:
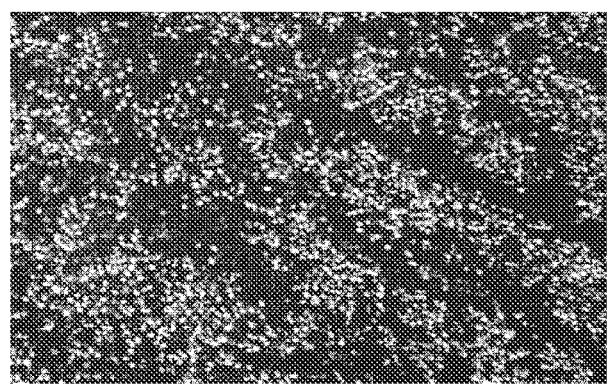
FIG. 3 is a photogram showing an observation by polarizing microscope (crossed nicols) of the film prepared in the practice of Example 1 in accordance with the present invention.

The depolarizing film prepared in the manner described above was found to be of the kind containing the dispersed microparticles expressing the anisotropy, the direction of which optical axis lies perpendicular to the direction of polarization of the polarized ultraviolet rays of light projected. The microgram of the depolarizing film according to this Example 1 is shown in FIG. 2 and the microgram of the depolarizing film according to this Example 1, which is observed under the crossed nicols, is shown in FIG. 3. Those micrograms make it clear that the phase difference was occurred only in the volumetric regions translucent to the filler material and even under the crossed nicols the translucent light occurred. Since no phase difference occurred in the volumetric regions not translucent to the fillet material, no translucent light occurred. As described above, the polarized light having passed through the depolarizing film according to this Example 1 is of a nature in which various polarized states were mixed up. Also, when the number of particles within a surface area of 0.11 mm$^2$ was measured, it was found that the number of the particles of not greater than 2 µm in particle size was 105; that within the range of 2 µm to not greater than 10 µm was 287; that within the range of 10 µm to not greater than 20 µm was 90; that within the range of 20 µm to not greater than 30 µm was 10; that within the range of 30 µm to not greater than 40 µm was 3, that within the range of 40 µm to not greater than 50 µm was 2; and that exceeding 50 µm was zero.

Figure 4:
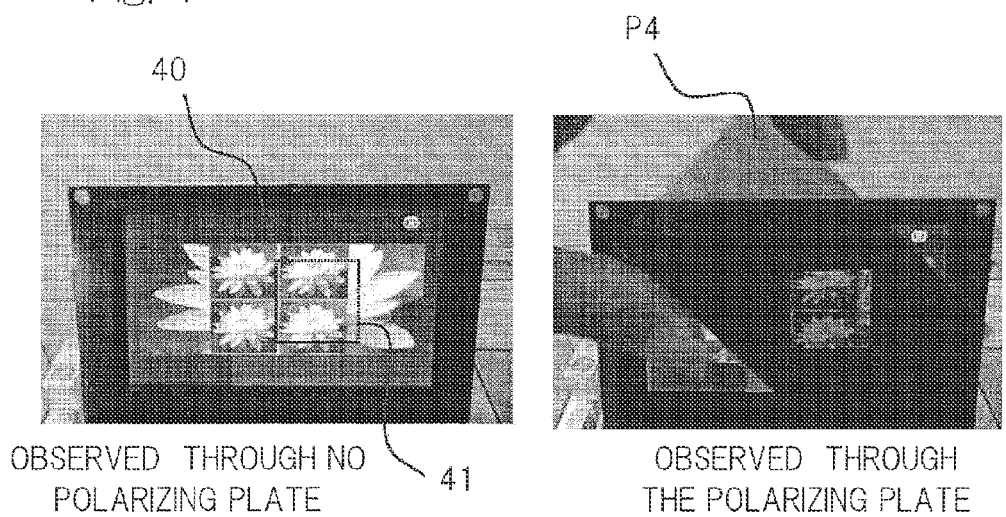
FIG. 4 is a photogram showing how the film prepared in the practice of Example 1 in accordance with the present invention is viewed when partially employed in a liquid crystal display device.

With an adhesive applied to a rear surface of the depolarizing film prepared according to Example 1, the depolarizing film was bonded to a display screen front surface of a liquid display device. The angle of bonding between the depolarizing film and the display screen front surface was so chosen that the direction of the optical axis of the microparticles might lie at 45° relative to the absorption axis of a polarizing plate on the liquid crystal display front surface. A result of observation with the depolarizing film (the volumetric region 41) according to Example 1 mounted, as viewed through no polarizing plate, and a result of observation as viewed through the polarizing plate P4 are shown in FIG. 4. According to the diagram showing the result of observation made through the polarizing plate P4, it is clear that in the volumetric region having no depolarizing film of Example 1 mounted, the absorption axis of the polarizing plate P4 and the absorption axis of the polarizing plate on the front surface of the liquid crystal display device lie perpendicular to each other and, therefore, light from the screen is intercepted, resulting in a darkened condition. In contrast thereto, in volumetric region having the depolarizing film of Example 1 mounted, light is transmitted therethrough and, therefore, an excellent visibility is maintained.

As hereinabove described, with the liquid crystal display device with the depolarizing film of the present invention applied thereto, even when the polarizing eyeglasses are worn on, the display screen will not be darkened. Also, as compared with the conventional technique in which a double refraction plate such as, for example, a ¼ wavelength plate is employed, the possibility of the color tone of the image being shaded can be suppressed.

Example 2

15 wt % of the 1,4-dioxane solution (Polymer 1: 20 wt %) of the polymer 1 prepared in the manner described previously was dispersed in a thermosetting solvent type hard coating agent (Principal components of the solvent: Methyl ethyl ketone and isopropanol, Non-volatile component: 30%, Viscosity: 5 cP). The resultant suspension was coated on a TAC film with the use of a spin coater driven under conditions of 1,000 rpm for 30 seconds. After the TAC film had been coated, the coated film was dried at room temperature and was then left to stand under the atmosphere of 80° C. for 3 minutes. When the resultant film was observed, the phase separated structure of the polymer 1 was found to be dispersed in the thermosetting solvent type hard coating agent. Thereafter, light projected from an ultraviolet projecting device with a high pressure mercury vapor lamp used as a light source was converted into a linearly polarized light with the use of a Glan-Taylor polarizing prism, and the coated layer was radiated for 400 seconds. The coated TAC film was placed within a temperature controlled bath of 125° C. and was subsequently allowed to cool down to room temperature in 20 minutes. Also, up until the UV curable hard coating agent, which forms the matrix, was completely solidified, the light from the ultraviolet projecting device illuminated through no Glan-Taylor polarizing prism, but left unpolarized.

The depolarizing film so prepared according to this Example 2 was found that the volumetric regions having an anisotropic property were expressed having been dispersed, with the direction of the optical axis thereof lying perpendicular to the direction of polarization of the polarized ultraviolet rays of light.

The depolarizing film was applied to the display screen front surface of the liquid display device with the adhesive having been applied to the rear surface thereof. With the liquid display device having the film of the present invention applied thereto in the manner described above, even when observation is made with the polarizing eyeglasses worn on, the display screen did not darken and the image displayed could be recognized. Also, as compared with the conventional technique in which a double refraction plate such as, for example, a ¼ wavelength plate is employed, the possibility of the color tone of the image being shaded can be suppressed.

Example 3

15 wt % of the polymer 1 prepared in the manner described previously was dispersed in an ultraviolet curable solventless type hard coating agent (Viscosity: 200 cP). The resultant suspension was coated on a TAC film with the use of a spin coater driven under conditions of 1,000 rpm for 30 seconds. After the TAC film had been coated, light projected from an ultraviolet projecting device with a high pressure mercury vapor lamp used as a light source was converted into a linearly polarized light with the use of a Glan-Taylor polarizing prism, and the coated layer was radiated for 400 seconds. The coated TAC film was placed within a temperature controlled bath of 125° C. and was subsequently allowed to cool down to room temperature in 20 minutes. Also, up until the UV curable hard coating agent, which forms the matrix, was completely solidified, the light from the ultraviolet projecting device illuminated through no Glan-Taylor polarizing prism, but left unpolarized.

The resultant film prepared according to this Example 3 was found that the anisotropy was expressed in the dispersed micropores, the direction of which optical axis did not oriented in a constant direction.

The depolarizing film in Example 3 was applied to the display screen front surface of the liquid display device with the adhesive having been applied to the rear surface thereof. With the liquid display device having the film of the present invention applied thereto in the manner described above, even when observation is made with the polarizing eyeglasses worn on, the display screen did not darken completely and the image displayed could be recognized. Also, as compared with the conventional technique in which a double refraction plate such as, for example, a ¼ wavelength plate is employed, the possibility of the color tone of the image being shaded can be suppressed.

Example 4

1 wt % of the microparticles of the polymer 1 prepared in the manner described previously was dispersed in a solvent type adhesive (Principal components of the solvent: 50% of ethyl acetate, 30% of toluene, 10% of acetone, 10% of others and 20% of an involatile component). The resultant suspension was coated on a TAC film with the use of a spin coater driven under conditions of 2,000 rpm for 30 seconds. After the TAC film had been coated, the film was allowed to stand under the atmosphere of 85° C. for 1 minute to dry. Then, light projected from an ultraviolet projecting device with a high pressure mercury vapor lamp used as a light source was converted into a linearly polarized light with the use of a Glan-Taylor polarizing prism, and the coated layer was radiated for 400 seconds. The coated TAC film was placed within a temperature controlled bath of 125° C. and was subsequently allowed to cool down to room temperature in 20 minutes. Also, up until the UV curable hard coating agent, which forms the matrix, was completely solidified, the light from the ultraviolet projecting device illuminated through no Glan-Taylor polarizing prism, but left unpolarized.

The resultant film prepared according to this Example 4 was found that the anisotropy was expressed in the dispersed micropores, the direction of which optical axis lies perpendicular to the direction of polarization of the polarized ultraviolet rays of light.

The depolarizing film in Example 4 was applied to the display screen front surface of the liquid display device with the adhesive having been applied to the rear surface thereof. The angle of bonding between the depolarizing film and the display screen front surface was so chosen that the direction of the optical axis of the microparticles might lie at 45° relative to the absorption axis of a polarizing plate on the liquid crystal display front surface. With the liquid display device having the film of the present invention applied thereto in the manner described above, even when observation is made with the polarizing eyeglasses worn on, the display screen did not darken completely and the image displayed could be recognized. Also, as compared with the conventional technique in which a double refraction plate such as, for example, a ¼ wavelength plate is employed, the possibility of the color tone of the image being shaded can be suppressed.

Example 5

As the filler material having the optically anisotropic property, microcrystalline particles of 4,4'-biphenol were used. 15 wt % of those microcrystalline particles were dispersed in a thermosetting solvent type hard coating agent (Principal components of the solvent: Methyl ethyl ketone and isopropanol, Involatile component: 30%, Viscosity: 5 cP). The resultant suspension was coated on a TAC film with the use of a spin coater driven under conditions of 1,000 rpm for 30 seconds. After the TAC film had been coated, the film was loaded into a temperature controlled bath of 125° C. to completely solidify the thermosetting solvent type hard coating agent, which formed the matrix.

With the film so prepared according to Example 5, the coating, in which the optically anisotropic microcrystalline particles were dispersed could be formed and the direction of the optical axis of the microcrystalline particles in the coating was not oriented in a uniform direction.

The film in Example 5 was applied to the display screen front surface of the liquid display device with the adhesive having been applied to the rear surface thereof. With the liquid display device having the film of the present invention applied thereto in the manner described above, even when observation is made with the polarizing eyeglasses worn on, the display screen did not darken completely and the image displayed could be recognized. Also, as compared with the conventional technique in which a double refraction plate such as, for example, a ¼ wavelength plate is employed, the possibility of the color tone of the image being shaded can be suppressed.

Example 6

0.4 wt % of the microparticles of the polymer 1 prepared in the manner described previously were dispersed in a PVA aqueous solution (20 wt %). The resultant suspension was subsequently cast and dried. Then, the cast film was peeled off from a glass substrate to provide a film of 50 μm in thickness containing the microparticles of the polymer 1 dispersed therein. Thereafter, light projected from an ultraviolet projecting device with a high pressure mercury vapor lamp used as a light source was converted into a linearly polarized light with the use of a Glan-Taylor polarizing prism, and the coated layer was radiated for 400 seconds. The coated film was placed within a temperature controlled bath of 125° C. and was subsequently allowed to cool down to room temperature in 20 minutes. Also, the coated surface was irradiated with the light from the ultraviolet projecting device for 400 seconds through no Glan-Taylor polarizing prism, but left unpolarized.

The resultant film prepared according to this Example 6 was found that the anisotropy was expressed in the dispersed micropores, the direction of which optical axis lies perpendicular to the direction of polarization of the polarized ultraviolet rays of light.

The film in Example 6 was applied to the display screen front surface of the liquid display device with the adhesive having been applied to the rear surface thereof. The angle of bonding between the depolarizing film and the display screen front surface was so chosen that the direction of the optical axis of the microparticles might lie at 45° relative to the absorption axis of a polarizing plate on the liquid crystal display front surface. With the liquid display device having the film of the present invention applied thereto in the manner described above, even when observation is made with the polarizing eyeglasses worn on, the display screen did not darken and the image displayed could be recognized. Also, as compared with the conventional technique in which a double refraction plate such as, for example, a ¼ wavelength plate is employed, the possibility of the color tone of the image being shaded can be suppressed.

Comparative Example 1

Comparative examples are hereinafter demonstrated.

Without the film of the present invention applied to the display screen front surface of the liquid crystal display device, and when observation was made with the polarizing eyeglasses worn on, darkening of the displayed image occurred depending on the angle over which the head was tilted, and no image could be recognized accordingly.

Comparative Example 2

The commercially available ¼ wavelength phase difference film was applied to the display screen front surface of the liquid crystal display device. The angle of bonding between the ¼ wavelength phase difference film and the display screen front surface was so chosen as to permit the direction of the optical axis of the ¼ wavelength phase difference film to lie at 45° relative to the absorption axis of the polarizing plate on the front surface of the liquid crystal display device.

When observation through the liquid crystal display device having the ¼ wavelength phase difference film applied thereto was made with the polarizing eyeglasses worn on, the displayed image so viewed did not darken, but shading of the color tone occurred depending on the angle over which the head was tilted.

With the present invention having been fully described hereinabove, it is clear that the use of the depolarizing film prepared in accordance with the present invention is effective to avoid those possibilities that when observation is made with the polarizing eyeglasses worn on, the displayed image may be darkened accompanied by reduction in visibility and, also, the displayed image may be undesirably colored, and, accordingly, the visibility of the display device can be secured.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

| [Reference Numerals] | |
| --- | --- |
| 11 | Film material |
| 12, 52, 62 | Filler material |
| 40 | Liquid crystal display device |
| 41 | Region |
| 51 | Hard coating agent |
| 53, 63 | Base film |
| 61 | Adhesive |
| P4 | Polarizing plate |

What is claimed is:

1. A film having a depolarizing function, which comprises an optically anisotropic volumetric region dispersed in a translucent matrix which is optically isotropic in a plane, that region being liquid crystalline polymer generated from methacrylic ester polymer, wherein a layer of an adhesive formed by the translucent matrix is provided on at least one surface of a translucent base film which is optically isotropic in a plane.

2. The film having the depolarizing function as claimed in claim 1, in which a hard coat layer formed by the translucent matrix is provided on at least one surface of the translucent base film.

3. A film having a depolarizing function, which comprises, in a process of manufacture of the film as defined in claim 2, a step of irradiating with a linearly polarized light.

4. A polarizing plate useable as a protective film, which comprises the film having a depolarizing function as defined in claim 2.

5. A polarizing plate laminated with the film having a depolarizing function as defined in claim 2.

6. The film as claimed in claim 1, in which the anisotropic volumetric region has an average particle size not greater than 50 micron.

7. The film as claimed in claim 1, in which the anisotropic volumetric region comprises a photo-alignment material.

8. A film having a depolarizing function, which comprises, in a process of manufacture of the film as defined in claim 1, a step of irradiating with a linearly polarized light.

9. The film as claimed in claim 1, in which the anisotropic volumetric region has an optical axis oriented in a constant direction.

10. A polarizing plate useable as a protective film, which comprises the film having a depolarizing function as defined in claim 1.

11. A polarizing plate laminated with the film having a depolarizing function as defined in claim 1.

12. A film having a depolarizing function, which further comprises, in a process of manufacture of the film as defined in claim 8, a step of heating and cooling the film in addition to the irradiation of the linearly polarized light.

13. A film having a depolarizing function, which further comprises, in a process of manufacture of the film as defined in claim 3, a step of heating and cooling the film in addition to the irradiation of the linearly polarized light.

* * * * *